United States Patent [19]
van Iperen

[11] Patent Number: 4,510,652
[45] Date of Patent: Apr. 16, 1985

[54] CARGO RESTRAINING DEVICE

[75] Inventor: Willem H. P. van Iperen, Westfield, N.J.

[73] Assignee: Sea-Land Industries, Inc., Elizabeth, N.J.

[21] Appl. No.: 464,338

[22] Filed: Feb. 7, 1983

[51] Int. Cl.³ ............................................. B65D 67/00
[52] U.S. Cl. ................................... 24/68 CD; 24/680; 24/71.2; 24/198; 410/12; 410/101; 410/103
[58] Field of Search .................... 24/19, 20 TT, 68 R, 24/68 C, 68 CD, 68 D, 68 E, 68 F, 69 R, 69 CT, 69 ST, 69 TM, 70 ST, 71.1, 71.2, 198, 265 R, 265 A, 265 CD, 269, 200; 248/154, 499, 504; 254/217, 223, 224, 227, 262; 410/11, 12, 20, 21, 101, 103

[56] References Cited

U.S. PATENT DOCUMENTS

| | | | |
|---|---|---|---|
| 1,273,115 | 7/1918 | Brooks | 24/71.2 X |
| 1,431,423 | 10/1922 | Reinboth | 24/19 X |
| 1,596,193 | 8/1926 | Kuhlman | 24/68 FP |
| 1,855,641 | 4/1932 | Marschall et al. | 254/217 |
| 2,036,866 | 4/1936 | Frost | 24/71.2 X |
| 2,458,287 | 1/1949 | Moon | 24/265 CD |
| 2,816,342 | 12/1957 | Hyre | 24/68 D X |
| 3,570,077 | 3/1971 | Hawie | 24/198 X |
| 3,678,541 | 7/1972 | Lefkowitz | 24/200 |
| 3,826,473 | 7/1974 | Huber | 24/71.2 |

*Primary Examiner*—Victor N. Sakran
*Assistant Examiner*—James R. Brittain

[57] ABSTRACT

A cargo restraining device having a plate with side walls and end walls and spaced-apart strap-receiving openings with an intermediate strap-supporting web between the openings for cooperatively receiving and supporting a strap threaded through the strap-receiving openings and supporting a removable fixture having strap tightening ratchet means on the plate for tightening a strap threaded through the plate by inserting fastening means through the strap and the strap receiving openings before removal of the fixture from cooperation with the tensioner plate.

2 Claims, 10 Drawing Figures

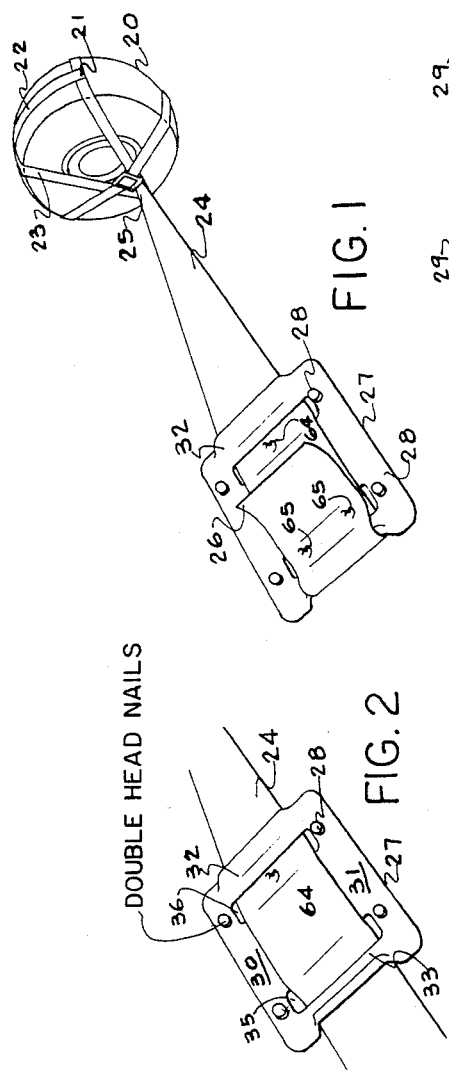
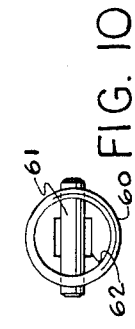
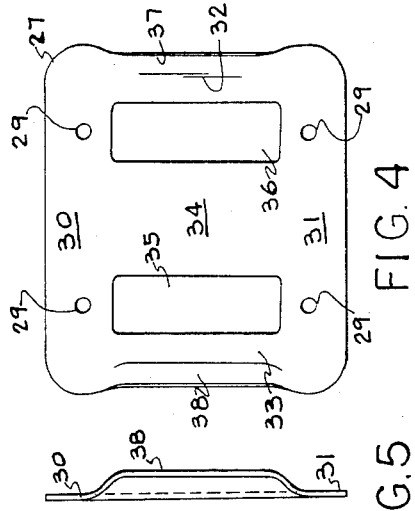
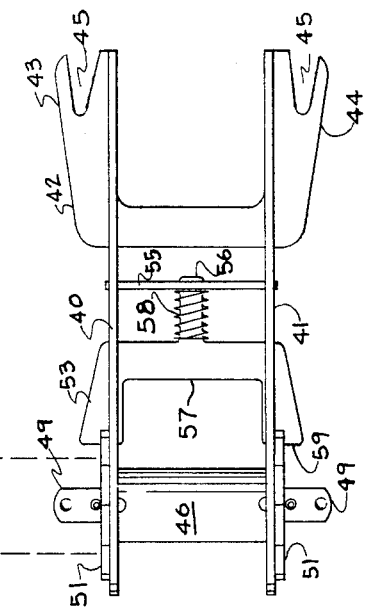
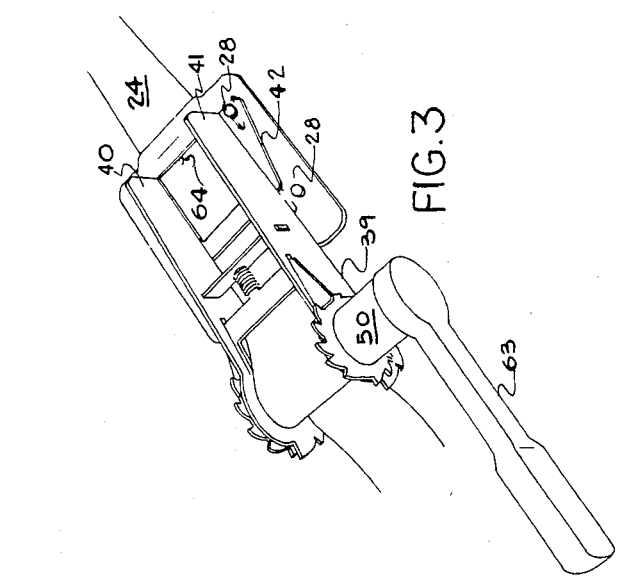
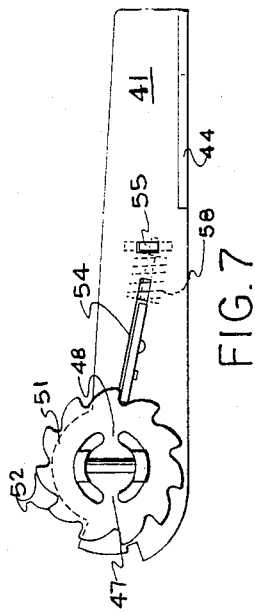
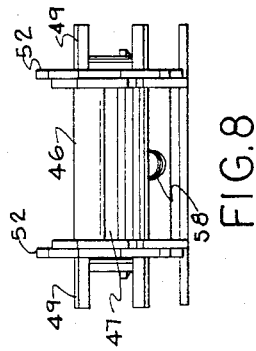

CARGO RESTRAINING DEVICE

BACKGROUND AND OBJECTIVES OF THE INVENTION

Motor vehicles are being shipped in closed containerized trailers or vehicles on land and aboard ship. Various vehicle supporting ramps and securing harnesses over the wheels are secured in some manner to maintain the vehicles against displacement laterally and longitudinally. Usually the container unit for housing the vehicle is provided with a wood base suitable for driving a nail into the floor or container platform without damaging the container.

Since the trans-shipment of vehicles and other commodities are in volume, the holding devices employed are expendable and must be of low unit cost otherwise the cost of installation would be prohibitive.

It is an objective of the present invention to provide a cargo restraining device in the form of a metal plate that may be secured to the floor of a container through which a strap may be threaded readily and tightened before securing the strap in position after it has enveloped an object such as a vehicle wheel in position.

Another objective of the present invention is to provide a readily removable or demountable fixture having a strap tightening ratchet means that may be positioned on a tension plate secured in position for tightening a strap threaded through the tension plate for tightening the strap in position during strap securement in the tension plate to the deck or platform of the container after which the fixture may be removed and reused for another installation.

Yet another objective of the present invention is to provide mating strap tensioning plate and a strap tightening ratchet means fixture for tightening a strap or other flexible member in position before securely fastening the strap or flexible member by means of fastening means in a tightened position and removal of the strap tightening ratchet means fixture from the tension plate.

Other objectives and many of the attendant advantages of the present invention will become more readily apparent to those skilled in the handling of cargo taken in conjunction with the accompanying drawing, specifications and claims in which variations and equivalents are contemplated.

SUMMARY OF THE INVENTION

A cargo restraining device having a plate for cooperatively receiving and threading a flexible strap or web therethrough secured to a platform or deck of a container to retain a vehicle wheel in a strap harness or other object to be secured by fastening the strap tension plate in position and threading the strap through the tension plate. A removable fixture having a strap tightening ratchet means is releasably mounted on the tension plate for cooperatively receiving the flexible strap to tighten it incrementally by means of a removable socket wrench. Upon tightening the flexible strap, fastening means are driven through the strap into the supporting base within the tension plate to securely fasten the strap in position in a tensioned condition for retention of the harness in position inhibiting displacement of the harnessed article and removal of the strap tightening ratchet means from positioning on the tension plate for reuse.

BRIEF DESCRIPTION OF DRAWING

FIG. 1 is a perspective view of a vehicle wheel secured by a strap harness and fastened to a strap tension plate fastened to a suitable platform or deck;

FIG. 2 is a perspective view of the strap tension plate in position with a portion of the strap laced through the tension plate;

FIG. 3 is a perspective view of the strap tension plate and strap portion as shown in FIG. 2 with a removable fixture having a strap tightening ratchet means thereon releasably mounted for tightening the strap;

FIG. 4 is a plan view of the tension plate;

FIG. 5 is a left end view of FIG. 4;

FIG. 6 is an exploded plan view of the removable fixture having a strap tightening ratchet means with a tightening socket disengaged from the ratchet;

FIG. 7 is a bottom view of FIG. 6;

FIG. 8 is a left end view of FIG. 7;

FIG. 9 is a right side view of the socket of FIG. 6; and

FIG. 10 is a bottom view of the socket in FIG. 6.

DETAILED DESCRIPTION OF PREFERRED EMBODIMENT OF THE INVENTION

The invention will be described in conjunction with the retention of a motor vehicle that is being shipped in a containerized unit for intermodal shipment whether on land or ocean voyage in which the container is provided with a wooden base or deck into which nails may be driven. While the invention is described with respect to a flexible strap or webbing that also fabricates the harness for restraining a vehicle wheel and tire assembly mounted on a motor vehicle, the appliances or devices used may be modified to accommodate ropes, chains and other tie-down members. In the place of nails, screws or other fastening members may be utilized and the use of the word "nail" will be equally applicable to other fastening members including staples, rivets, bolts, lag screws, among others.

Referring to the drawing and particularly to FIG. 1, there is illustrated a vehicle tire and wheel assembly 20 that is mounted on a motor vehicle (not shown) that is housed within a wheeled container or tractor (not shown) that is provided with a wooden platform or deck. A wheel harness 21 made preferably of flexible woven polyester yarns and consisting of a series of encircling and cross-straps 22 and 23 embrace the vehicle tire and wheel assembly 20. An elongated tie-down strap 24 is suitably buckled and secured at one end 25 to the hub of the harness 21. The free end 26 of strap 24 is laced through the metal integral stamping tensioner plate 27 that is initially fastened to the deck of the container by means of double-headed nails 28 that pass through spaced openings 29 in the plate 27. The double-headed nails 28 may be driven to their limits into the deck since the strap 24 is laced through plate 27 before nailing to the floor thereby providing increased friction and making it easier to retain strap tension even before nailing of the strap to the floor.

Strap tension plate 27 is preferably a metal stamping provided with side walls 30 and 31 that are preferably parallel to each other and end walls 32 and 33 that are also preferably parallel to each other. A web section 34 extends medially across the plate 27 between the strap-receiving elongated openings 35 and 36 through each of which the flexible strap 24 is laced as shown in FIG. 2. The free end walls 32 and 33 are preferably upturned to have inclined lip edges 37 and 38 to reduce any abrasive cutting action of the metal edges against the strap 24 which is engaged by the lip edges. The gauge of the metal plate may vary depending upon the load to which the strap may be subjected. One eighth inch to three-sixteenths inch thick plates should provide a range of suitable rigidity without buckling under load.

Upon securing the harness 21 about the tire and wheel assembly 20, and fastening the strap 24 to the harness hub 25, the tension plate 27 may then be partially secured in spaced position to the assembly 20 and fastened to the wooden base by driving double-headed nails 28 through nail-receiving spaced openings 29 in the side walls 30 and 31 of plate 27. Double-headed nails 28 are preferred since they may be removed very readily for detaching the strap 24, harness 21 and tension plate 27 to clear the deck for other cargo when vehicles are off-loaded. The strap 24 is laced under the the loosely or partially secured plate 27 under the end wwall 32 and through the opening 36. The strap 24 is passed over the web 34 before being laced through the opening 35 and then passed under the end wall 33 as illustrated in FIG. 2.

A removable fixture 39 having parallel guide rails 40 and 41 is mounted on a U-shaped yoke or bracket 42 to which the guide rails 40 and 41 are welded. The U-shaped bracket 42 has protruding web legs 43 and 44 in which there are elongated flared openings 45 for mating alignment with the nail receiving openings 29 in the side walls 30 and 31 closest to the front leading end wall 32 for sliding locking engagement with the protruding double-headed nails 28. Web legs 43 and 44 taper inwardly to avoid the protruding nails 28 in the openings 29 closest to the rear end wall 33.

A split web retaining cylinder 46 is rotatably mounted in the guide rails 40 and 41 opposite from the bracket 42. Strap receiving elongated slots 47 and 48 are provided in the cylinder 46 to retain the strap 24 on the cylinder 46. Socket-engaging lugs 49 extend beyond the rails 40 and 41 from the cylinder 46 at each end thereof for cooperatively receiving a releasable socket 50 thereon. A ratchet disk member 51 having a series of camming teeth 52 thereon is secured to each end of the cylinder 46. A U-shaped pawl 53 is resiliently guidably supported for reciprocating displacement in the guide rail slot 54 to engage with the ratchet camming teeth 52. A cross bar 55 is secured to the guide rail 40 and 41 intermediate their length for slidably retaining from removal the guide stud 56 that is secured to the medial portion 57 of the U-shaped pawl 53 and about which guide stud 56, a helical spring 58 is retained, for resilient reciprocation of the U-shaped pawl 53 into and out of locking engagement with the camming teeth 52 by the ratchet tooth-engaging end portion and 59.

The removable socket 50 is provided with a cylindrical wall 60 and a lug-engaging cross pin 61 for releasably engaging the split lug 49 protruding from cylinder 46. A lug wrench square socket opening 62 is provided at the opposite end of the socket 50 to be releasably engaged by a square lug socket ratchet wrench 63 for rotating the socket 50 and cylinders 46 to tighten the strap 24 after it is properly laced and secured in the cylinder 46 as shown in FIG. 3.

When the strap 24 is properly laced through the tension plate 27, and the double-headed fastening nails 28 have been securely fastened to hold the plate 27 fixed in position on the deck, the strap 24 is restrained in position as stated previously. Upon lacing the strap 24 into the elongated slots 47 and 48 in the cylinder 46, the ratchet wrench 63 is rotated to rotate the cylinder 46 thereby drawing and further tightening the strap 24 through the tension plate 27 to the wheel and tire harness 21. A double-headed nail 64 is driven through the strap 24 into the deck below to fasten the strap 24 in a tensioned or taut condition after the strap has been drawn tightly about rotable cylinder 46 by actuation of the ratchet wrench 63 and locked by the ratchet teeth 52 with the pawl 58 and 59. The fixture 39 may be removed by disengaging the strap 24 from the cylinder 46. The free end 26 of the strap that is disengaged from the cylinder 46 may then be folded back over the rear end wall 33 of the plate 27 and fastened by double-headed nail 65 to the deck below through the opening 35 in the plate 27 securing the two plies of strap, one under and one over the end wall 33, as shown in FIG. 1, with any excess length of strap 24 being removed, if necessary. For disengagement of the strap 24 and the plate 27, a claw hammer or crowbar may be placed between the nail heads of the double-headed nails and readily withdrawn freeing the strap 24, harness 21, and plate 27 for reuse, if desirable.

Fixture 39 may be retained at one location for reuse repeatedly and need not be transshipped with the cargo but retained at the loading site.

I claim:

1. A cargo restraining device having a tension plate for secure mounting on a platform for a flexible strap, web or the like, said plate having side walls and end walls, spaced-apart strap-receiving openings in said plate, and an intermediate strap-supporting web extending from said side walls between said openings, said side walls having plate-retaining means in said side walls to retain said tension plate on a platform, said plate having at least one upturned strap-receiving lip edge and said plate end walls each having an upturned strap-receiving lip edge; said walls having spaced-apart plate-retaining openings therethrough for receiving fastening means therethrough and retaining said tension plate on a platform, and a removable fixture having a strap-tightening ratchet means releasably mounted on said plate, said fixture having laterally spaced guide rails straddling said spaced-apart strap-receiving openings in said plate, said ratchet having a strap retaining cylinder rotatably mounted in said guide rails, means on said guide rails for releasably locking said ratchet means whereby a strap threaded through said strap openings may be fastened to said strap-retaining cylinder for tightening upon actuation of said ratchet means for securing said strap in the tightened position while inserting fasteners through said strap positioned in said strap-receiving openings.

2. A cargo restraining device having a tension plate as claimed in claim 1, said removable fixture ratchet means and said strap retaining rotatable cylinder having means for releasably retaining a strap thereon, a series of ratchet teeth on said cylinder, a spring actuated pawl for releasably engaging said ratchet teeth to releasably lock said ratchet means incrementally upon rotation for tightening said strap, and a U-shaped base member retaining said laterally spaced guide rails for cooperatively mounting said fixture on said tension plate.

* * * * *